United States Patent [19]

Ushizaka et al.

[11] Patent Number: 5,415,912
[45] Date of Patent: May 16, 1995

[54] PRESSURE-SENSITIVE ADHESIVE COMPOSITION

[75] Inventors: Yoshitaka Ushizaka; Shinya Watanabe, both of Tokyo, Japan

[73] Assignee: Toshiba Silicone Co., Ltd., Tokyo, Japan

[21] Appl. No.: 123,042

[22] Filed: Sep. 20, 1993

Related U.S. Application Data

[63] Continuation of Ser. No. 940,695, Sep. 3, 1992, abandoned.

[30] Foreign Application Priority Data

Sep. 6, 1991 [JP] Japan .................. 3-254115

[51] Int. Cl.⁶ .............................................. B32B 25/20
[52] U.S. Cl. ...................................... 428/40; 428/447; 525/100; 525/477
[58] Field of Search ................. 525/477, 100; 428/447, 428/40

[56] References Cited

U.S. PATENT DOCUMENTS

| | | | |
|---|---|---|---|
| 3,983,298 | 9/1976 | Hahn et al. | 525/477 |
| 4,591,622 | 5/1986 | Blizzard et al. | 525/477 |
| 4,652,618 | 3/1987 | Sumida et al. | 525/477 |
| 5,169,727 | 12/1992 | Boardmann | 428/447 |

FOREIGN PATENT DOCUMENTS

| | | |
|---|---|---|
| 57-2412 | 11/1958 | Belgium . |
| 50-35091 | 11/1975 | Japan . |
| 54-72300 | 6/1979 | Japan . |
| 56-164858 | 12/1981 | Japan . |
| 60-13813 | 1/1985 | Japan . |
| 62-215646 | 9/1987 | Japan . |
| 62-232448 | 10/1987 | Japan . |
| 62-232476 | 10/1987 | Japan . |
| 63-15848 | 1/1988 | Japan . |
| 63-15849 | 1/1988 | Japan . |
| 63-248860 | 10/1988 | Japan . |
| 3-41156 | 2/1991 | Japan . |
| 4-30974 | 5/1992 | Japan . |

*Primary Examiner*—Ralph H. Dean
*Attorney, Agent, or Firm*—Sughrue, Mion, Zinn, Macpeak & Seas

[57] ABSTRACT

A pressure-sensitive adhesive composition comprising (A) a pressure-sensitive adhesive and (B) a polyorganosilsesquioxane fine powder is disclosed. The composition shows excellent adhesion tackiness, and enables smooth rewinding during production of pressure-sensitive tapes.

16 Claims, No Drawings

PRESSURE-SENSITIVE ADHESIVE COMPOSITION

This is a Continuation of application No. 07/940,695 filed Sep. 3, 1992 now abandoned.

FIELD OF THE INVENTION

The present invention relates to a pressure-sensitive adhesive composition, especially a silicone-based pressure-sensitive adhesive composition. More particularly, this invention relates to a pressure-sensitive adhesive composition which enables smooth rewinding during the production of pressure-sensitive tapes and which shows good adhesion and tackiness and has good transparency.

BACKGROUND OF THE INVENTION

Silicone-based pressure-sensitive adhesive compositions are superior to other pressure-sensitive adhesives in low-temperature resistance, electrical characteristics, and other properties and, hence, the range of the use of the compositions is increasing in recent years and the demand for the compositions is also increasing steadily.

In general, in the production of a pressure-sensitive tape, a pressure-sensitive adhesive is coated on a tape substrate made of a plastic or other material to form a pressure-sensitive adhesive layer, the coated tape is wound, and rewinding is then conducted in order to slit the coated tape. This process has often had problems that rewinding cannot be conducted smoothly because of troubles such as loud noises made by the rewinding, resulting in a low working efficiency for rewinding, and that the surface smoothness of the pressure-sensitive adhesive layer is impaired by the rewinding and, as a result, rewound tape products have unevenness for adhesion properties.

As an expedient for improving the efficiency of rewinding, a technique of adding a filler, such as calcium carbonate, titanium oxide, zinc oxide, aluminum hydroxide, quartz powder, diatomaceous earth, clay, or silica, to pressure-sensitive adhesives is being employed. However, the addition of such a filler to silicone-based pressure-sensitive adhesives generally impairs adhesion and tackiness. In addition, such silicone-based pressure-sensitive adhesives have had problems that when coated on a substrate, the pressure-sensitive adhesives are less apt to give a smooth coat surface to show poor film-forming properties, and that they have poor transparency.

On the other hand, where a plastic film made of a polyolefin such as polyethylene or polypropylene, a polyester such as poly(ethylene terephthalate), or the like is printed, coated, or subjected to a similar treatment, a treating agent such as a chlorinated polyolefin (JP-B-50-35091), acrylic resin, silane-modified polyolefin (JP-A-56-164858), or the like is being used as a treating agent to form a primer coat on the film surface, in order to improve wettability by or affinity for the printing ink or coating composition to be applied. (The terms "JP-B" and "JP-A" as used herein mean an "examined Japanese patent publication" and an "unexamined published Japanese patent application", respectively.) However, since films having such a primer coat formed thereon generally show poor slip properties, development of a treating agent which gives good slip properties for easy handling has been desired. Although a silicone oil, stearic acid ester, or the like has been added to the treating agents for the purpose of improving slip properties, there has been a problem that the thus-improved slip properties are gradually impaired with the lapse of time. Further, there are cases that even with such a surface treatment, the treated film is not satisfactorily coated or printed according to the kind of the coating composition or printing ink used. Thus, there has also been a desire for a treating agent which can impart better coating suitability to plastic films.

SUMMARY OF THE INVENTION

The present inventors have conducted extensive studies to overcome the above-described problems. As a result, it has been found that a pressure-sensitive adhesive composition which has good adhesion and tackiness and enables smooth rewinding during the production of pressure-sensitive adhesive tapes can be obtained when a fine powder of polymethylsilsesquioxane is added as a filler to a pressure-sensitive adhesive. The present invention has been completed based on this finding.

Accordingly, an object of the present invention is to provide a pressure-sensitive adhesive composition which has good adhesion and tackiness and enables smooth rewinding during the production of pressure-sensitive adhesive tapes, thereby to eliminate the problems described above.

Another object of the present invention is to provide a pressure-sensitive adhesive composition which, when applied on a film to form a primer coat on the film surface, imparts good coating suitability and good slip properties to the film.

The pressure-sensitive adhesive composition according to the present invention comprises
(A) a pressure-sensitive adhesive, and
(B) a polyorganosilsesquioxane fine powder.

DETAILED DESCRIPTION OF THE INVENTION

The pressure-sensitive adhesive used as component (A) in the composition of the present invention is not particularly limited, and any of generally known silicone-based, acrylic, and rubber-based pressure-sensitive adhesives and the like can be used. However, silicone-based pressure-sensitive adhesives are especially preferred because component (B) can fully exhibit its effect when used with the silicone-based pressure-sensitive adhesive. A particularly preferred silicone-based pressure-sensitive adhesive is a reaction product obtained by reacting a polyorganosiloxane comprising structural units shown by the formula $(R^1)_a SiO_{(4-a)/2}$ (wherein $R^1$ each represents a substituted or unsubstituted monovalent hydrocarbon group and symbol a is a number of from 1.8 to 2.1) with an organosiloxane copolymer containing organosiloxane units shown by the formula $(R^2)_3 SiO_{\frac{1}{2}}$ (wherein $R^2$ each represents a substituted or unsubstituted monovalent hydrocarbon group) and siloxane units shown by the formula $SiO_2$.

In the polyorganosiloxane comprising structural units of $(R^1)_a SiO_{(4-a)/2}$, each of the $R^1$ groups is a substituted or unsubstituted monovalent hydrocarbon group selected from the group consisting of an alkyl group (e.g., methyl, ethyl, propyl, and butyl), a cycloalkyl group (e.g., cyclohexyl), an alkenyl group (e.g., vinyl and allyl), an aryl group (e.g., phenyl and tolyl), a substituted hydrocarbon group formed by replacing part or all of the carbon-bonded hydrogen atoms of the group by a halogen atom, cyano group, or other substituent (e.g., chloromethyl, trifluoropropyl, and cyanoethyl), and the like. If symbol a is smaller than 1.80, the polyorganosiloxane is apt to gel. If symbol a exceeds 2.1, the polyorganosiloxane is apt to change its form from an oily state to a lower-viscosity state. It is preferable that this polyorganosiloxane has a degree of polymerization of from 100 to 10,000 in the range of from an oily state to a raw rubber-like state. The polyorganosiloxane may be one in which the molecular chain thereof has been terminated by a hydroxyl group, vinyl group, trialkylsilyl group, alkoxy group, or the like. Further, the polyorganosiloxane may be a mixture of two or more of such various polyorganosiloxanes.

The organosiloxane copolymer described above contains organosiloxane units shown by the formula $(R^2)_3SiO_{\frac{1}{2}}$ and siloxane units shown by the formula $SiO_2$. Examples of $R^2$ include the same substituted or unsubstituted monovalent hydrocarbon groups as those for $R^1$ described above. Too large a proportion of $SiO_2$ units in the organosiloxane copolymer results in a pressure-sensitive adhesive having poor adhesion and tackiness, while too small a proportion thereof results in a pressure-sensitive adhesive having poor cohesive force. It is therefore preferred that the molar ratio of $(R^2)_3SiO_{\frac{1}{2}}$ units to $SiO_2$ units is from 0.5/1.0 to 1.0/1.0.

Although the organosiloxane copolymer may further contain other units such as a unit of $(R^2)_2SiO$ and a unit of $R^2SiO_{3/2}$, it is preferable that from the standpoint of properties of the pressure-sensitive adhesive to be produced, the copolymer consist of $(R^2)_3SiO_{\frac{1}{2}}$ units and $SiO_2$ units only. This organosiloxane copolymer can, for example, be obtained by a method in which hydrolyzable silanes selected from, for example, triorganochlorosilanes, triorganoalkoxysilanes, tetrachlorosilane, tetraalkoxysilanes, and the like and corresponding to the desired respective siloxane units are subjected to hydrolytic co-condensation preferably in the presence of a solvent. In general, the thus-obtained organosiloxane copolymer contains a silanol group.

The pressure-sensitive adhesive which can be used as component (A) in the composition of the present invention can be easily obtained by reacting the above-described polyorganosiloxane comprising structural units of the formula $(R^1)_aSiO_{(4-a)/2}$ with the above-described organosiloxane copolymer containing organosiloxane units shown by the formula $(R^2)_3SiO_{\frac{1}{2}}$ and siloxane units shown by $SiO_2$. This reaction can be easily carried out by bringing the polyorganosiloxane into contact with the organosiloxane copolymer in the presence or absence of a suitable solvent for both reactants at a temperature of from room temperature to the boiling point of the solvent used.

The polyorganosilsesquioxane fine powder used as component (B) in the composition of the present invention serves to enable smooth rewinding during pressure-sensitive adhesive tape production without impairing the adhesion, tackiness, film-forming properties, and transparency of the pressure-sensitive adhesive used. Hence, component (B) is characteristic of the composition of the present invention.

The polyorganosilsesquioxane fine powder can be obtained by various methods such as a method in which methyltrichlorosilane is hydrolyzed in an atomized state or methyltrichlorosilane is dropped into a large quantity of water to allow the methyltrichlorosilane droplets to undergo hydrolytic condensation (Belgian Patent 572,412), a method in which methyltrialkoxysilane or the like is allowed to undergo hydrolytic condensation in an aqueous solution containing an alkali metal carbonate or an alkaline earth metal hydroxide (JP-A-54-72300), and a method in which methyltrialkoxysilane is allowed to undergo hydrolytic condensation in an aqueous solution of ammonia or an amine (JP-A-60-13813). Of these methods, the method of JP-A-60-13813 is preferred from the standpoint of attaining the effects of the invention, because polyorganosilsesquioxane fine powder obtained by this method has a low chlorine atom content, contains neither an alkali metal nor an alkaline earth metal, and shows excellent free-flowing properties. It is preferred that the polyorganosilsesquioxane fine powder (B) comprises independent, almost truly spherical particles and has a particle size distribution such that 80% or more of the particles have particle diameters within the range of ±30% of the average particle diameter of component (B).

The average particle diameter of the polyorganosilsesquioxane fine powder (B) is preferably in the range of from 0.05 to 100 μm, with the more preferred range thereof being from 0.1 to 20 μm. Polyorganosilsesquioxane fine powder having too small an average particle diameter is difficult to produce, while polyorganosilsesquioxane fine powder having too large an average particle diameter not only is difficult to produce but also adversely affects smooth tape rewinding, which is one of the effects of the present invention.

The amount of the polyorganosilsesquioxane fine powder (B) used in the composition of the present invention preferably is 0.1 part by weight or more and, from the standpoint of obtaining good adhesion and tackiness, 20 parts by weight or less, per 100 parts by weight of the pressure-sensitive adhesive (A). An especially preferred amount of component (B) added is from 1 to 5 parts by weight per 100 parts by weight of component (A).

By mixing the pressure-sensitive adhesive (A) and the polyorganosilsesquioxane fine powder (B) in a predetermined proportion, the composition of the present invention can be obtained. The thus-obtained composition of the present invention may be used to produce a pressure-sensitive tape or sheet. In this case, the composition may be uniformly coated on a tape- or sheet-form substrate or other substrate to form a pressure-sensitive adhesive layer on the substrate.

For the purpose of attaining easy coating, the composition of the present invention may be diluted with a solvent to decrease the viscosity thereof. After coating, the solvent can be removed by air drying or heating. The pressure-sensitive adhesive layer to be formed should have a thickness larger than the maximum particle size of the fine particles of component (B) in the composition. If the thickness of the pressure-sensitive adhesive layer is too small, good adhesion and tackiness cannot be obtained. Therefore, the pressure-sensitive adhesive layer preferably has a thickness larger than 1.5 times, more preferably 2 times, the average particle size of component (B).

After the coating composition has been thus coated to form a pressure-sensitive adhesive layer, the resulting tape or sheet is usually wound into a roll. Alternatively, it is possible to cover the pressure-sensitive adhesive layer with a separately prepared release paper in a tape or sheet form in a manner such that the pressure-sensitive adhesive layer is contacted with the release surface of the release paper, and then to wind the resulting structure as a two-layer film. In general, winding of such a two-layer film has so far posed a problem, for example, that the film being wound is rumpled. This rumpling problem, however, can be overcome by use of the pressure-sensitive adhesive composition of the present invention. In particular, in the case of using a plastic film as the above release paper in a tape or sheet form, it is preferred to employ, as the plastic film, a film which contains the polyorganosilsesquioxane fine powder used as component (B) in the present invention, because an excellent rumpling-preventive effect can be produced by the combined use of the composition of the invention and such a special release paper. In the case of containing the polyorganosilsesquioxane fine powder in the release paper (plastic film), there are the following two methods: one method is to incorporate the fine powder into the plastic film as disclosed in, for example, JP-B-4-30974, JP-A-62-215646, JP-A-62-232448 and JP-A-62-232476, and another method is to add the fine powder to a release agent for the plastic film as disclosed in, for example, JP-A-63-15848 and JP-A-63-15849.

In producing the composition of the present invention, it is preferred that components (A) and (B) are mixed under heating. This is because heating not only improves the dispersibility of the fine powder of component (B) but also gives a composition which enables smoother tape rewinding during production of the pressure-sensitive adhesive tape. The heating temperature generally is from 30° to 200° C., preferably from 50° to 150° C.

In the case of using a silicone-based pressure-sensitive adhesive as component (A), it is preferred to crosslink the pressure-sensitive adhesive coated on a substrate thereby to increase the cohesive force of the adhesive. This crosslinking can be accomplished by a conventionally known method. For example, the following method can be employed: a method which comprises adding an organic peroxide such as benzoyl peroxide or 2,4-dichlorobenzoyl peroxide to the pressure-sensitive adhesive composition and heating the resulting composition to a temperature not lower than the decomposition temperature of the peroxide, thereby to crosslink the pressure-sensitive adhesive; a method which comprises adding an alkoxysilane such as aminopropyltriethoxysilane, N-($\beta$-aminoethyl)-$\gamma$-aminopropyltrimethoxysilane, $\gamma$-methacryloxypropyltrimethoxysilane, or vinyltrimethoxysilane to the pressure-sensitive adhesive composition thereby to react the alkoxysilane with silanol groups in the pressure-sensitive adhesive and crosslink it; and a method where the organic groups contained in the siloxane units in the pressure-sensitive adhesive include an alkenyl group such as vinyl, an organohydrogensiloxane containing, per molecule, two or more hydrogensiloxane units shown by Si—H is added as a crosslinking agent to the pressure-sensitive adhesive composition along with platinum, a platinum compound, a rhodium compound, or the like thereby to crosslink the pressure-sensitive adhesive. Of these, the method using an organic peroxide and the hydrosilylation crosslinking reaction using a platinum catalyst are generally preferred from the standpoint of working efficiency.

Where the pressure-sensitive adhesive composition of the present invention is used as a treating agent for plastic films or the like, it is preferred to use the composition in combination with a conventional treating agent. In this case, the composition of the present invention preferably is blended in an amount of from 0.5 to 50% by weight, more preferably from 1 to 20% by weight, based on the weight of the treating agent obtained by the blending. Usually, this blending is accomplished by mixing the composition of the present invention and a conventional treating agent in a solvent to obtain a uniform mixture. Besides chlorinated polyolefins, acrylic resins, silane-modified polyolefins, and the like as described above, examples of the conventional treating agent that can be blended with the composition of the present invention include polyurethanes, silicone resins, and modified polyolefins. Further, a treating agent to which polyorganosilsesquioxane fine powder which is the same as component (B) used in the present invention has been added beforehand (as disclosed in, for example, JP-A-63-248860) may also be blended with the composition of the present invention. In this case, the amount of the polyorganosilsesquioxane fine powder added to a conventional treating agent preferably is from 0.1 to 20% by weight.

The treating agent thus obtained may be regulated to have a desired viscosity by, for example, dilution with a solvent, before being coated on a film and dried to conduct surface treatment of the film. The drying may be performed with heating. In this treatment, the treating agent is applied such that a coating film has a dry thickness of from 0.1 to 100 $\mu$m, preferably from 0.5 to 10 $\mu$m.

As described above, the pressure-sensitive adhesive composition of the present invention enables smooth rewinding of pressure-sensitive tapes while retaining adhesion, tackiness, and film-forming properties, due to the polyorganosilsesquioxane fine powder contained therein. Therefore, the composition of the invention contributes to improvements in the production efficiency of pressure-sensitive tape and in the quality of the product. Further, since the pressure-sensitive adhesive composition of the present invention has excellent transparency, the composition can also be advantageously applied to pressure-sensitive films for the protection of labels bearing a bar code to be read optically.

Furthermore, the composition of the present invention, when used in combination with a conventional surface-treating agent for plastic films, imparts good suitability for coating or printing and good slip properties to plastic films having poor coating or printing suitability, such as polyolefin films.

The present invention will be explained below in more detail with reference to the following examples, but the invention is not construed as being limited thereto. In the Synthesis Examples, Examples, and Comparative Examples given below, all parts and percents are by weight and the viscosity values were obtained at 25° C.

SYNTHESIS EXAMPLE 1

Synthesis of Polymethylsilsesquioxane Fine Powder (I)

Into a four-necked flask equipped with a thermometer, reflux condenser, and stirrer were introduced 500 parts of water and 50 parts of 28% aqueous ammonia. Subsequently, 200 parts of methyltrimethoxysilane was gradually added dropwise to the resulting aqueous ammonia solution with stirring over a period of about 40 minutes. As a reaction proceeded, the temperature of the contents in the flask rose from 10° C. at the beginning of the dropwise addition of methyltrimethoxysilane to 30° C. at the end of the addition. The resulting reaction mixture was heated with a mantle heater and refluxed at 84° C. with stirring for about 1 hour. After cooling, a reaction product precipitated in the flask was filtered off, washed with water, dried, and then pulverized to obtain polymethylsilsesquioxane fine powder (I) having an average particle diameter of 2 μm and excellent free-flowing properties.

SYNTHESIS EXAMPLE 2

Synthesis of Truly Spherical Polymethylsilsesquioxane Fine Powder (II)

Into a four-necked flask equipped with a thermometer, reflux condenser, and stirrer were introduced 4,000 parts of water and 50 parts of 28% aqueous ammonia. The contents were then stirred at 100 rpm for 10 minutes to obtain a homogeneous aqueous ammonia solution. Subsequently, 600 parts of methyltrimethoxysilane having a chlorine content of 10 ppm or less was added rapidly to this aqueous ammonia solution with stirring at 5 rpm in a manner such that the methyltrimethoxysilane added did not mix with the aqueous ammonia solution and the resulting contents in the flask came into a two-phase state, with the methyltrimethoxysilane as the upper phase and the aqueous ammonia solution as the lower phase. A hydrolytic condensation reaction was proceeded at the interface between the methyltrimethoxysilane and the aqueous ammonia solution with stirring at 20 rpm while maintaining the two-phase state.

As the reaction proceeded, particles formed as a reaction product gradually precipitated into the lower phase, the lower phase turned milky due to the suspended reaction product particles, and the thickness of the methyltrimethoxysilane phase as the upper phase gradually decreased and disappeared in about 3 hours. Thereafter, the temperature of the reaction mixture was maintained at 50° to 60° C., and the reaction mixture was kept being stirred under the same conditions for 3 hours and then cooled to 25° C. The precipitated particles formed by the reaction were filtered off with a 100-mesh metal screen and dehydrated into a cake by centrifugation. This cake was dried in a 200° C. drying oven and the dry cake was reduced to particles using a jet-mill. Thus, polymethylsilsesquioxane fine powder (II) was obtained as a white powder.

The thus-obtained polymethylsilsesquioxane fine powder was almost truly spherical and had an average particle diameter of about 1.9 μm.

SYNTHESIS EXAMPLE 3

Synthesis of Truly Spherical Polymethylsilsesquioxane Fine Powder (III)

The same procedures as in Synthesis Example 2 were conducted except that the amount of 28% aqueous ammonia was changed to 5 parts and the stirring speed for stirring the two-phase-state reactants was changed to 25 rpm. As a result, truly spherical polymethylsilsesquioxane fine powder (III) having an average particle diameter of 4.5 μm was obtained.

EXAMPLE 1

In 140 parts of toluene were dissolved 100 parts of a polydimethylsiloxane raw rubber in which the molecular chain thereof had been terminated at both ends by a hydroxyl group and having an average degree of polymerization of 7,000 and 110 parts of a polymethylsiloxane comprising $(CH_3)_3SiO_{\frac{1}{2}}$ units and $SiO_2$ units in a molar ratio of 0.8:1.0. To this solution was added a 10% aqueous solution of sodium hydroxide in an amount of 5 ppm in terms of the amount of sodium hydroxide based on the amount of the siloxanes. This mixture was heated with refluxing for 6 hours. The resulting mixture was neutralized by adding thereto a 10% isopropyl alcohol solution of phosphoric acid in an amount of 10 ppm in terms of the amount of phosphoric acid based on the amount of the siloxanes and stirring the resulting mixture. As a result, a silicone-based pressure-sensitive adhesive (I) was obtained as a colorless and transparent, viscous liquid having a nonvolatile content of 60.2% and a viscosity of 115,000 cSt. To this silicone-based pressure-sensitive adhesive were added the polymethylsilsesquioxane fine powder (I) obtained in Synthesis Example 1 in an amount of 2 parts per 100 parts of the non-volatile matter of the adhesive. The resulting mixture was homogenized by stirring it at 50° C. for 1 hour, thereby preparing a silicone-based pressure-sensitive adhesive composition according to the present invention. This composition was evaluated for adhesion, ball tack, cohesive force, suitability for rewinding, film-forming property, and transparency. The results obtained are shown in Table 1.

The evaluation was conducted according to the following methods.

1) Measurement of Adhesion

A test sample was placed on the center of a stainless-steel plate (SUS304 (27CP), 280-grit) with the pressure-sensitive adhesive layer of the sample facing downward, and a metallic roller having a weight of 2,000±50 g which was covered with a rubber layer having a thickness of about 6 mm was rolled on the sample forward and backward once at a speed of 300 mm/min to press-bond the sample to the plate. This test piece was allowed to stand for 16 hours in an atmosphere regulated at a constant temperature of 23°±2° C. and a constant humidity of 60±5% RH. Thereafter, the sample was folded in its free part at an angle of 180°, and the free end of the sample was pulled to continuously peel the sample from the plate at a speed of 300 mm/min. The force required for the peeling was measured.

2) Measurement of Ball Tack

Tack was measured by a slope-type ball tack method in which steel balls (JIS G4805, SUJ2) were allowed to roll down an approach slope having a slant angle of 30° and an approach distance of 10 cm, and whether the balls stopped within a 10 cm area of pressure-sensitive adhesive layer was examined. Tack values are shown in terms of the diameter number of the largest ball which stopped within the area.

3) Measurement of Cohesive Force

A test sample was applied to the same stainless-steel plate as used in method 1) above with an adhesion area of 20 mm (length) by 10 mm (width). A weight of 1,000±10 g was then hung from the sample. This test piece was allowed to stand for 30 minutes in an atmosphere regulated at a constant temperature of 23°±2° C. and a constant humidity of 60±5% RH. Cohesive force values are shown in terms of distance over which the sample shifted on the plate in the 30-minute period.

4) Examination of Suitability for Rewinding

In the adhesion measurement described above, the state of the sample being peeled was examined. Samples which were peeled smoothly are shown by ◯, those which were peeled partly intermittently are shown by Δ, and those which were peeled wholly intermittently are shown by ×.

5) Examination of Film-Forming Property

In preparing test samples by the method described after, the surface of a pressure-sensitive adhesive layer formed by coating the pressure-sensitive adhesive composition on a film substrate and baking the coating was examined. Samples having a smooth surface are shown by ◯, those having slight unevenness by Δ, and those having considerable unevenness by ×.

6) Examination of Transparency

The silicone-based pressure-sensitive adhesive composition was diluted with toluene to a non-volatile content of 50%. The diluted composition was poured into a beaker to the depth of 2 cm, air-dried for 2 days, and then heated at 50° C. for 1 day to evaporate the solvents. The thus-formed, silicone-based pressure-sensitive adhesive layer was examined to evaluate its transparency. Samples having good transparency are shown by ◯, those having slightly poor transparency by Δ, and those having poor transparency by ×.

7) Preparation of Test Sample

Test samples to be subjected to the measurements of adhesion, ball tack, and cohesive force were prepared by coating the silicone-based pressure-sensitive adhesive composition on a polyimide film (25 mm wide, 0.025 mm thick) at a thickness of 40 μm with an applicator, air-drying the coating for 5 minutes, and then baking the dry coating at 180° C. for 3 minutes.

EXAMPLE 2

A silicone-based pressure-sensitive adhesive composition was prepared and evaluated in the same manner as in Example 1 except that the amount of the polymethylsilsesquioxane fine powder obtained in Synthesis Example 1 was changed to 1 part. The results obtained are shown in Table 1.

EXAMPLE 3

A silicone-based pressure-sensitive adhesive composition was prepared and evaluated in the same manner as in Example 1 except that the amount of the polymethylsilsesquioxane fine powder obtained in Synthesis Example 1 was changed to 5 parts. The results obtained are shown in Table 1.

COMPARATIVE EXAMPLE 1

A silicone-based pressure-sensitive adhesive composition was prepared and evaluated in the same manner as in Example 1 except that the polymethylsilsesquioxane fine particles obtained in Synthesis Example 1 were not added to the composition. The results obtained are shown in Table 1.

TABLE 1

|  | Example 1 | Example 2 | Example 3 | Comparative Example 1 |
|---|---|---|---|---|
| Components | | | | |
| Kind of filler (B) | I | I | I | — |
| Amount of filler (B) (parts) | 2.0 | 1.0 | 5.0 | 0 |
| Kind of silicone-based pressure-sensitive adhesive (A) | I | I | I | I |
| Evaluation Results | | | | |
| Adhesion (g/25 mm) | 750 | 780 | 710 | 800 |
| Ball tack (No.) | 32< | 32< | 32< | 32< |
| Cohesive force (mm) | 0.12 | 0.12 | 0.10 | 0.08 |
| Suitability for rewinding | ◯ | ◯ | ◯ | × |
| Film-forming property | ◯ | ◯ | ◯ | ◯ |
| Transparency | ◯ | ◯ | ◯ | ◯ |

EXAMPLE 4

A silicone-based pressure-sensitive adhesive composition was prepared and evaluated in the same manner as in Example 1 except that the polymethylsilsesquioxane fine powder (II) obtained in Synthesis Example 2 was used in place of the polymethylsilsesquioxane fine powder obtained in Synthesis Example 1. The results obtained are shown in Table 2.

EXAMPLE 5

A silicone-based pressure-sensitive adhesive composition was prepared and evaluated in the same manner as in Example 1 except that the polymethylsilsesquioxane fine powder (III) obtained in Synthesis Example 3 was used in place of the polymethylsilsesquioxane fine powder obtained in Synthesis Example 1. The results obtained are shown in Table 2.

COMPARATIVE EXAMPLE 2

A silicone-based pressure-sensitive adhesive composition was prepared and evaluated in the same manner as in Example 1 except that a lightweight calcium carbonate powder having an average particle diameter of 0.1 μm (trade name, MSK-G; manufactured by Maruo Calcium Co., Ltd., Japan) was used in place of the polymethylsilsesquioxane fine powder obtained in Synthesis Example 1. The results obtained are shown in Table 2.

COMPARATIVE EXAMPLE 3

A silicone-based pressure-sensitive adhesive composition was prepared and evaluated in the same manner as in Example 1 except that fumed silica (trade name, Aerosil 200; manufactured by Nippon Aerosil Co., Ltd., Japan) was used in place of the polymethylsilsesquioxane fine powder obtained in Synthesis Example 1. The results obtained are shown in Table 2.

COMPARATIVE EXAMPLE 4

A silicone-based pressure-sensitive adhesive composition was prepared and evaluated in the same manner as in Example 1 except that a quartz powder (trade name, Crystallite VX-S; manufactured by Tatsumori Co., Japan) was used in place of the polymethylsilsesquioxane fine powder obtained in Synthesis Example 1. The results obtained are shown in Table 2.

TABLE 2

|  | Example 4 | Example 5 | Comparative Example 2 | Comparative Example 3 | Comparative Example 4 |
|---|---|---|---|---|---|
| Components | | | | | |
| Kind of filler (B) | II | III | Calcium carbonate | Fumed silica | Quartz powder |
| Amount of filler (B) (parts) | 2.0 | 2.0 | 2.0 | 2.0 | 2.0 |
| Kind of silicone-based pressure-sensitive adhesive | I | I | I | I | I |

TABLE 2-continued

|  | Example | | Comparative Example | | |
|---|---|---|---|---|---|
|  | 4 | 5 | 2 | 3 | 4 |
| (A) | | | | | |
| Evaluation Results | | | | | |
| Adhesion (g/25 mm) | 790 | 780 | 650 | 720 | 670 |
| Ball tack (No.) | 32< | 32< | 28 | 32< | 30 |
| Cohesive force (mm) | 0.10 | 0.10 | 0.15 | 0.10 | 0.12 |
| Suitability for rewinding | ○ | ○ | ○ | Δ | Δ |
| Film-forming property | ○ | ○ | ○ | X | ○ |
| Transparency | ○ | ○ | X | Δ | Δ |

EXAMPLE 6

In 260 parts of toluene were dissolved 190 parts of a raw rubber-like polydiorganosiloxane in which the molecular chain thereof had been terminated at both ends by a hydroxyl group and which was composed of siloxane units shown by the formula $R_2SiO$ (wherein 95 mol % of the R groups were methyl and 5 mol % thereof were phenyl) and had a degree of polymerization of 5,000 and 200 parts of a polymethylsiloxane comprising $(CH_3)_3SiO_{\frac{1}{2}}$ units and $SiO_2$ units in a molar ratio of 0.8:1.0. To this solution was added a 10% aqueous solution of sodium hydroxide in an amount of 5 ppm in terms of the amount of sodium hydroxide based on the amount of the siloxanes. This mixture was heated with refluxing for 6 hours.

The resulting mixture was then neutralized by adding thereto a 10% isopropyl alcohol solution of phosphoric acid in an amount of 10 ppm in terms of the amount of phosphoric acid based on the amount of the siloxanes and stirring the resulting mixture. As a result, a silicone-based pressure-sensitive adhesive (II) was obtained as a colorless and transparent, viscous liquid having a non-volatile content of 60.5% and a viscosity of 95,600 cSt.

To this silicone-based pressure-sensitive adhesive were added the polymethylsilsesquioxane fine powder (II) obtained in Synthesis Example 2 in an amount of 2 parts per 100 parts of the nonvolatile matter of the adhesive. The resulting mixture was homogenized by sufficiently stirring it at 50° C. for 1 hour, thereby preparing a silicone-based pressure-sensitive adhesive composition according to the present invention. This composition was evaluated for adhesion, ball tack, cohesive force, suitability for rewinding, film-forming property, and transparency. The results obtained are shown in Table 3.

EXAMPLE 7

In 147 parts of toluene were dissolved 100 parts of a raw rubber-like polydimethylsiloxane in which the molecular chain thereof had been terminated at both ends by a hydroxyl group and which was composed of $(CH_3)_2SiO$ units and had a degree of polymerization of 6,000 and 120 parts of a polymethylphenylsiloxane comprising $(CH_3)_3SiO_{\frac{1}{2}}$ units, $SiO_2$ units, and $(C_6H_5)_2SiO$ units in a molar ratio of 0.8:1.0:0.05. To this solution was added 4 parts of 25% aqueous ammonia. This mixture was stirred at 40° C. for 3 hours, heated to 110° C. in a weak stream of nitrogen gas, and then further heated at that temperature for 3 hours, thereby to remove the aqueous ammonia by evaporation. As a result, a silicone-based pressure-sensitive adhesive (III) was obtained as a colorless and transparent, viscous liquid having a nonvolatile content of 59.5% and a viscosity of 135,000 cSt.

To this silicone-based pressure-sensitive adhesive were added the polymethylsilsesquioxane fine powder (II) obtained in Synthesis Example 2 in an amount of 2 parts per 100 parts of the nonvolatile matter of the adhesive. The resulting mixture was homogenized by sufficiently stirring it at 50° C. for 1 hour, thereby preparing a silicone-based pressure-sensitive adhesive composition according to the present invention. This composition was evaluated for adhesion, ball tack, cohesive force, suitability for rewinding, film-forming property, and transparency. The results obtained are shown in Table 3.

TABLE 3

|  | Example | |
|---|---|---|
|  | 6 | 7 |
| Components | | |
| Kind of filler (B) | II | II |
| Amount of filler (B) (parts) | 2.0 | 2.0 |
| Kind of silicone-based pressure-sensitive adhesive (A) | II | III |
| Evaluation Results | | |
| Adhesion (g/25 mm) | 750 | 800 |
| Ball tack (No.) | 32< | 32< |
| Cohesive force (mm) | 0.10 | 0.08 |
| Suitability for rewinding | ○ | ○ |
| Film-forming property | ○ | ○ |
| Transparency | ○ | ○ |

EXAMPLE 8

1 Part of the polymethylsilsesquioxane fine powder (I) obtained in Synthesis Example 1 was added to 100 parts of a non-volatile matter of an acrylic pressure-sensitive adhesive (Oribain BPS 8170, trade name, manufactured by Toyo Ink Manufacturing Co., non-volatile content: 37.5%), and the resulting mixture was stirred at 50° C. for 1 hour to prepare a pressure-sensitive adhesive composition of the present invention.

The composition was coated on a polyethylene terephthalate film (thickness: 50 μm) in the same manner as in Example 1. The coated film as a release liner (separator) was bonded to a release-treated polyethylene terephthalate film (thickness: 25 μm) in a manner such that the coated surface was contacted with the release-treated surface to prepare a test sample, and occurrence of rumpling was observed.

The release treatment of the release liner was conducted in the following manner.

The polymethylsilsesquioxane fine powder (I) obtained in Synthesis Example 1 was added to a condensation-curing type silicone composition for release paper (YSR 3022, trade name, manufactured by Toshiba Silicone Co., non-volatile content: 30%) in an amount of 1% based on the weight of the non-volatile content. The resulting mixture was coated on the film at a thickness of 0.8 g/m², and heat cured at 140° C. for 30 seconds.

In bonding, the test sample was press-bonded by rolling the same roller as used for the measurement of adhesion in Example 1 on the sample forward and backward once at a speed of 300 mm/min. The occurrence of rumpling at this time was observed. As a result, a test sample having no rumpling was obtained.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition used in an adhesive tape produced in a process which comprises a rewinding step, which pressure-sensitive adhesive composition comprises:
   (A) a pressure-sensitive adhesive, and
   (B) a polyorganosilsesquioxane fine powder comprising freely-flowable substantially spherical particles having an average particle diameter of from 0.05 to 100 μm, wherein said polyorganosilsesquioxane fine powder is present in an amount from 0.1 to 20 parts by weight per 100 parts by weight of said pressure sensitive adhesive.

2. A composition as claimed in claim 1, wherein said pressure-sensitive adhesive (A) is a silicone-based pressure-sensitive adhesive comprising a reaction product of a polyorganosiloxane comprising structural units represented by the formula $(R^1)_aSiO_{(4-a)/2}$ wherein $R^1$ each represents a substituted or unsubstituted monovalent hydrocarbon group and a is a number of from 1.8 to 2.1, and an organosiloxane copolymer containing organosiloxane units represented by the formula $(R^2)_3SiO_{\frac{1}{2}}$ wherein $R^2$ each represents a substituted or unsubstituted monovalent hydrocarbon group, and siloxane units represented by the formula $SiO_2$.

3. A composition as claimed in claim 2, wherein said polyorganosiloxane has a degree of polymerization of from 100 to 10,000.

4. A composition as claimed in claim 2, wherein the molar ratio of the $(R^2)_3SiO_{\frac{1}{2}}$ units to the $SiO_2$ units is from 0.5/1.0 to 1.0/1.0.

5. A composition as claimed in claim 1, wherein said polyorganosilsesquioxane fine powder (B) is present in an amount from 1 to 5 parts by weight.

6. A composition as claimed in claim 1, wherein said polyorganosilsesquioxane fine powder (B) has a particle size distribution such that 80% or more of the particles have particle diameters within the range of ±30% of the average particle diameter of the powder.

7. A composition as claimed in claim 1, wherein said polyorganosilsesquioxane fine powder (B) has an average particle diameter from 0.1 to 20 μm.

8. A pressure-sensitive adhesive substrate wherein the pressure-sensitive property of the substrate is imparted by a pressure-sensitive adhesive layer, wherein the pressure-sensitive adhesive layer comprises the pressure-sensitive adhesive composition as claimed in claim 1 wherein said pressure-sensitive adhesive composition is used in an adhesive tape produced by a production step having a rewinding step, and the pressure-sensitive adhesive layer has a thickness larger than 1.5 times the average particle size of the fine powder of component (B).

9. A composition as claimed in claim 1, wherein said pressure-sensitive adhesive is an acrylic pressure-sensitive adhesive.

10. A composition as claimed in claim 1, wherein said pressure-sensitive adhesive is a rubber-based pressure-sensitive adhesive.

11. A pressure-sensitive adhesive composition as claimed in claim 1, which is obtained by mixing component (A) and component (B) under heating at a temperature of from 30° to 200° C.

12. A process for producing a pressure-sensitive adhesive composition, which comprises mixing (A) a pressure-sensitive adhesive and (B) a polyorganosilsesquioxane fine powder under heating at a temperature of from 30° to 200° C.

13. A composite comprising a substrate having coated thereon the composition of claim 1, and a release paper bonded to the coated surface, wherein said composition is used in an adhesive tape produced by a production step having a rewinding step.

14. A composite as claimed in claim 13, wherein said release paper is treated with a release agent containing (B) a polyorganosilsesquioxane fine powder comprising freely-flowable substantially spherical particles having an average particle diameter of from 0.05 to 100 μm.

15. A laminate which is wound into a roll, which comprises a substrate having coated on one side thereof the pressure-sensitive adhesive composition of claim 1, wherein said composition is used in an adhesive tape produced by a production step having a rewinding step.

16. A surface treating agent for plastic films, comprising a treating agent selected from acrylic resins, polyurethanes or modified polyolefins and from 0.5 to 50% by weight of the pressure-sensitive composition of claim 1.

* * * * *